United States Patent
Petit

(10) Patent No.: US 10,822,864 B2
(45) Date of Patent: Nov. 3, 2020

(54) COMPLIANT HERMETIC SEAL SYSTEM FOR FLAT GLASS PANEL ASSEMBLY

(71) Applicant: V-GLASS, INC., Pewaukee, WI (US)

(72) Inventor: Peter Petit, Pewaukee, WI (US)

(73) Assignee: V-GLASS, INC., Pewaukee, WI (US)

( * ) Notice: Subject to any disclaimer, the term of this patent is extended or adjusted under 35 U.S.C. 154(b) by 258 days.

(21) Appl. No.: 15/116,504

(22) PCT Filed: Jan. 30, 2015

(86) PCT No.: PCT/US2015/013687
§ 371 (c)(1),
(2) Date: Aug. 3, 2016

(87) PCT Pub. No.: WO2015/116898
PCT Pub. Date: Aug. 6, 2015

(65) Prior Publication Data
US 2017/0191304 A1 Jul. 6, 2017

Related U.S. Application Data

(60) Provisional application No. 61/935,250, filed on Feb. 3, 2014.

(51) Int. Cl.
*E06B 3/66* (2006.01)
*E06B 3/667* (2006.01)
(Continued)

(52) U.S. Cl.
CPC .............. *E06B 3/667* (2013.01); *C03C 27/10* (2013.01); *E06B 3/6612* (2013.01);
(Continued)

(58) Field of Classification Search
CPC .... E06B 3/667; E06B 3/6617; E06B 3/66357; E06B 3/66304; E06B 3/66328; C03C 27/10; Y02B 80/24
(Continued)

(56) References Cited

U.S. PATENT DOCUMENTS

| 49,167 A | 8/1865 | Stetson |
| 2,707,850 A | 5/1955 | Dalton et al. |

(Continued)

FOREIGN PATENT DOCUMENTS

| CN | 1678810 | 10/2005 |
| CN | 1717526 | 1/2006 |

(Continued)

OTHER PUBLICATIONS

PCT/US2015/013687 International Search Report and Written Opinion of the International Searching Authority dated Apr. 9, 2015 (14 pages).

(Continued)

*Primary Examiner* — Brian E Glessner
*Assistant Examiner* — Adam G Barlow
(74) *Attorney, Agent, or Firm* — Michael Best & Friedrich LLP

(57) ABSTRACT

A hermetically-sealed enclosure including at least two wall elements of substantially congruent shapes, and a spacer system that defines an interior space between the wall elements. The enclosure also includes a bridge element that has one or more flexible metal foil layers extending between adjacent, respective edges of the wall elements to isolate the interior space from a surrounding environment. The bridge element is substantially free of step discontinuities in total thickness along the intended weld path, and the bridge element is bonded to each of the wall elements via an ultrasonic weld to form a continuous bond line.

20 Claims, 14 Drawing Sheets

(51) Int. Cl.
*E06B 3/663* (2006.01)
*C03C 27/10* (2006.01)
*C03C 27/06* (2006.01)

(52) U.S. Cl.
CPC ........ *E06B 3/6617* (2013.01); *E06B 3/66357* (2013.01); *C03C 27/06* (2013.01); *E06B 3/66* (2013.01); *Y02A 30/25* (2018.01); *Y02B 80/24* (2013.01)

(58) Field of Classification Search
USPC ... 52/171.3, 204.5, 204.591, 204.593, 786.1, 52/786.13
See application file for complete search history.

(56) References Cited

U.S. PATENT DOCUMENTS

| | | | |
|---|---|---|---|
| 3,360,849 | A | 1/1968 | Forman et al. |
| 3,455,015 | A | 7/1969 | Daniels et al. |
| 4,015,071 | A | 3/1977 | Peet |
| 4,334,398 | A * | 6/1982 | Grether ............... E06B 3/66 52/222 |
| 4,431,691 | A | 2/1984 | Greenlee |
| 4,831,799 | A * | 5/1989 | Glover ............... E06B 3/66328 52/171.3 |
| 5,005,577 | A | 4/1991 | Frenkel |
| 5,007,217 | A * | 4/1991 | Glover ............... E06B 3/66328 428/34 |
| 5,227,206 | A | 7/1993 | Bachli |
| 5,361,587 | A | 11/1994 | Hoffman |
| 5,489,321 | A | 2/1996 | Tracy et al. |
| 5,657,607 | A | 8/1997 | Collins et al. |
| 6,286,288 | B1 | 9/2001 | France |
| 6,365,242 | B1 | 4/2002 | Veerasamy |
| 6,478,911 | B1 | 11/2002 | Wang et al. |
| D479,005 | S | 8/2003 | France |
| D479,006 | S | 8/2003 | Hornung |
| 6,662,523 | B2 | 12/2003 | Hornung et al. |
| 6,676,786 | B1 | 1/2004 | Collins et al. |
| 6,679,013 | B2 | 1/2004 | Hornung |
| 6,759,590 | B2 | 7/2004 | Stark |
| 6,793,990 | B1 * | 9/2004 | Sakaguchi ............ E06B 3/6612 156/109 |
| 7,097,724 | B2 | 8/2006 | Hornung et al. |
| 7,293,391 | B2 * | 11/2007 | Guhl ..................... C03C 27/06 52/204.593 |
| 7,493,739 | B2 * | 2/2009 | Baratuci ............. E06B 3/66309 52/172 |
| 7,765,769 | B2 * | 8/2010 | Rosskamp ............ E06B 3/24 428/34 |
| 8,329,267 | B2 | 12/2012 | Bettger et al. |
| 9,545,682 | B2 * | 1/2017 | Sridharan .............. H01L 23/10 |
| 2008/0245011 | A1 | 10/2008 | Friedl |
| 2010/0319751 | A1 * | 12/2010 | Day ................. H01L 31/022425 136/244 |
| 2011/0296771 | A1 * | 12/2011 | Miller ................. E06B 3/66342 52/171.3 |
| 2012/0269996 | A1 * | 10/2012 | Jager .................... E06B 3/6612 428/34 |
| 2012/0279170 | A1 | 11/2012 | Francis, IV et al. |
| 2012/0321821 | A1 * | 12/2012 | Li ....................... B23K 1/0008 428/34 |
| 2013/0140347 | A1 | 6/2013 | Friedl et al. |

FOREIGN PATENT DOCUMENTS

| | | | |
|---|---|---|---|
| EP | 2439372 | 4/2012 | |
| WO | 2012/058938 | 5/2012 | |
| WO | 2012170566 | 12/2012 | |
| WO | WO 2012170566 A1 * | 12/2012 | ........... E06B 3/6612 |

OTHER PUBLICATIONS

Rozenberg, "Editor, Physical Principles of Ultrasonic Technology," book, vol. 1 (1973) Acoustics Institute, Academy of Sciences of the USSR.

Kuckert et al., "Helium-tight Sealing of Glass with Metal by Ultrasonic Welding," journal, Advanced Engineering Materials, vol. 3, Issue 11, pp. 903-905, Nov. 2001.

Maeda et al., "Deformation Behavior of Thick Aluminum Wire during Ultrasonic Bonding," article (2013) Materials Transactions, vol. 54, No. 6, pp. 916 to 921, Special Issue on Nanojoining and Microjoining, The Japan Institute of Metals and Materials.

Ediss, "Effect of Vacuum Pressure on the Thermal Loading the ALMA Cryostat," website (2006) http://www.alma.nrao.edu/memos/html-memos/alma554/.

"WKK University of Kaiserslautern, ""Torsion Welding of Metal to Glass—Technische Univeritat Kaiserlautern University/Telsonic torsion welder,"" website (first known to us at least as early as Nov. 6, 2014) Switzerland http://www.uni-kl.de/en/moved-to-mv/wkk/wkk-forschung/wkk-f-ultra/wkk-f-ult1/".

WKK University of Kaiserslautern, "Ultrasonic Seam Welding of Metal to Metallized Glass—Sonobond," website (first known to us at least as early as Nov. 6, 2014) http://www.uni-kl.de/en/moved-to-mv/wkk/wkk-forschung/wkk-f-ultra/wkk-f-ult1/.

First Office Action from the State Intellectual Property Office of China for Application No. 201580013865.4 dated Jun. 1, 2017 (16 pages).

EP15743968.8 Extended European Search Report dated Oct. 24, 2017 (7 pages).

* cited by examiner

COMPLIANT HERMETIC SEAL SYSTEM FOR FLAT GLASS PANEL ASSEMBLY

CROSS-REFERENCE TO RELATED APPLICATIONS

This application claims priority to U.S. Provisional Application Ser. No. 61/935,250, filed Feb. 3, 2014, the entire contents of which are hereby incorporated by reference.

BACKGROUND

The present invention relates to a flat panel glass assembly or glazing unit and, more specifically, to a flat glass panel assembly including a flexible seal system and a method for making same.

Hermetically sealing a flat enclosure made from glass panes eliminates deleterious gas migration into and out of the enclosure. Large flat hermetically-sealed glass enclosures may be used as fog-free multi-pane argon-filled insulating glass units for windows, vacuum insulated glazing units, flat panel displays, and neutron detector panels for detecting nuclear materials.

Many existing insulated glazing elements (e.g., vacuum-insulated glass units or glass assemblies) include two or more glass panes that are separated from each other by a space. A temperature differential across the glass panel assembly can significantly impact the structure of the assembly and, in some cases, cause the assembly to fail. More specifically, the temperature of the exterior pane typically approaches the outside air temperature (contracting when exposed to cold, expanding when exposed to heat). The interior pane typically remains at a relatively constant temperature that is consistent with the inside air temperature (e.g., in a building). Movement of the exterior pane (i.e. contraction or expansion) relative to the interior pane is known as "differential pane movement."

Some existing evacuated glazing units typically include relatively rigid or inelastic seals that do not provide satisfactory accommodation for differential pane movement. Some units utilize a solder seal, but in cold weather (or with enough differential movement), the solder seal can break due to its relative brittleness. Other existing glazing units incorporate a seal made of several foil strips that bridge the gap between panes. However, glazing units include corners and/or curved edges, and the complex stress patterns induced by differential pane expansion can make sealing the corners quite difficult. Rectangular glass panes may be considered to expand and contract uniformly about the centroid of the pane. The largest relative movement between panes occurs at the farthest locations from the centroid, that is, at the corners. Moreover, the corner movement is not perpendicular to the edges of the pane, but along a line passing through the centroid, and differential pane movement increases in proportion to the size of the panels.

The differential pane movement at corners produces complex behavior in the seal with a sideways shear component that can lead to wrinkling or breakage of the foil strips. In addition, gaps in foil continuity and abrupt foil thickness changes at overlaps tend to produce leakage paths. In glazing units sealed using organics, low-emissivity coatings must be removed from the sealant-to-glass contact area using a process called "edge deletion". If this is not done, corrosion would eventually cross the seal line, creating a leakage path between sealant and glass.

SUMMARY

The current invention is based on several principles learned through extensive trial-and-error testing. For spliced joints, the use of multiple foil layers of multiple thicknesses provides an opportunity to accommodate a joint in one foil layer and still produce a hermetic weld taking steps to avoid a thickness discontinuity, such as a gap or step, along the intended weld path. Such steps include, for example, using well-fitted butt joints, or overlaying the joint in the first layer with a second foil layer which is joint-free, as least in the location of the joint in the first foil layer at any intended weld path. In some aspects, weld segments can be overlapped to form continuous hermetic seals, for example, by the use of crisscross welds at right angles, or by creating a long weld from two shorter ones by the use of overlapping ends.

Overlapping parallel welds provide excellent adhesion to each glass pane (e.g., with the welds overlapping slightly at their adjacent edges, for example, by offsetting the second weld track from the first weld track by half the width of a weld). Also, the foil can be welded to coated glass (e.g., low-emissivity coated glass) without removing the coating. An ultrasonic weld breaks up the coating across the weld line and disperses the debris particles (isolated from one another) to stop the progress of corrosion.

The invention generally provides a seal design that is flexible enough to accommodate differential pane movement, and tolerant of a large temperature difference from one flat panel element to the other. The flexible hermetic corner seal can be made using a cold welding technique (e.g., ultrasonic welding of metal foil to glass) to allow the use of tempered glass and sputtered low-emissivity coatings without causing detriment or damage due to a seal manufacturing process requiring high temperature. The seal can be fabricated at atmospheric pressure or under vacuum conditions.

In some aspects, the flexible seal provided by the present invention can have a joint-less design (i.e. made from a single sheet of foil) to eliminate the need for cross-weld joints. The invention also allows the temperature of a glass pane edge to be close to that of the center of that pane, not only to minimize heat loss (that is, behave as a so-called "warm edge"), but also to eliminate the risk of spontaneous pane breakage due to buildup of tensile stress in an edge which is substantially colder than the pane center.

In one embodiment, the invention is directed to a hermetically-sealed enclosure including at least two wall elements of substantially congruent shapes, and a spacer system that defines an interior space between the wall elements. The enclosure also includes a bridge element that has one or more flexible metal foil layers extending between adjacent, respective edges of the wall elements to isolate the interior space from a surrounding environment. The bridge element is substantially free of step discontinuities in total thickness along the intended weld path, and the bridge element is bonded to each of the wall elements via an ultrasonic weld to form a continuous bond line.

In another embodiment, the invention provides a method of manufacturing a hermetically-sealed enclosure. The method includes assembling first and second wall elements of substantially congruent shapes together and separating the two wall elements from each other to form a space, and extending a bridge element between adjacent, respective edges of the wall elements. The bridge element includes one or more layers of flexible metal foil, and the bridge element is substantially free of step discontinuities in total thickness. The method also includes bonding the bridge element to the first wall element by ultrasonic welding to form a continuous bond on the first wall element, and bonding the bridge element to the second wall element by ultrasonic welding to form a continuous bond on the second wall element.

In another embodiment, the invention provides an insulated glazing unit including a first flat panel element, a second flat panel element, and a plurality of spacers disposed between the first flat panel element and the second flat panel element to space the first flat panel element from the second flat panel element. The first and second flat panel elements have congruent shapes. The glazing unit also includes a bridge element that has one or more flexible metal foil layers extending between adjacent, respective edges of first and second flat panel elements to isolate the interior space from a surrounding environment. The bridge element is substantially free of step discontinuities in total thickness along the intended weld path, and the bridge element is bonded to each of the wall elements via an ultrasonic weld to form a continuous bond line.

Other aspects of the invention will become apparent by consideration of the detailed description and accompanying drawings.

BRIEF DESCRIPTION OF THE DRAWINGS

FIG. 1b is a partial section view of the exemplary enclosure of FIG. 1a.

FIG. 9b illustrates a partial section view of the two-layer foil bridge system of FIG. 9a.

Figure 1A:
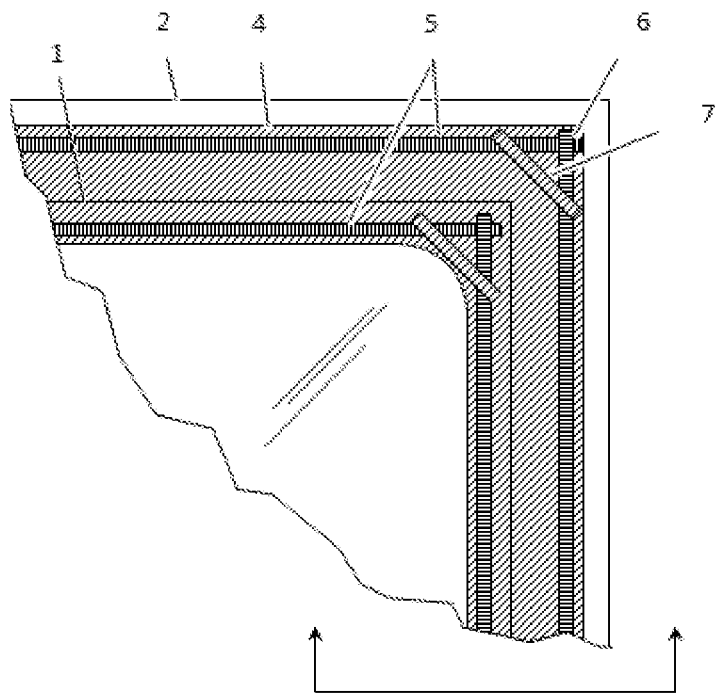
FIG. 1a is an elevation view of a portion of an exemplary enclosure having spaced apart wall elements and illustrating a foil bridge corner seal.

It should be understood that the invention is not limited in its application to the details of construction and the arrangements of the components set forth in the following description or illustrated in the above-described drawings. Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

As used herein, the terms "insulated glazing unit" and "glass panel assembly" are synonymous and denote a window glazing assembly formed from one or more glass members or glass elements (referred to as glass panes for purposes of description) that are at least partially transparent to electromagnetic radiation, that are substantially parallel along their planar faces, and that are substantially congruent shapes with surrounding edges sealed to form an interior space between the glass panes. These terms also encompass flat panel assemblies that have at least one element including glass and another element that can include glass, ceramic, aluminum, stainless steel, or other material. The interior space can be at least partially filled with a gas that is less conductive and, in some constructions, more viscous than air, or evacuated (e.g., by drawing a vacuum).

"Pane" refers to a glass element intended for use as a wall element in a flat hermetically-sealed enclosure assembly.

"Differential pane movement" refers to the relative pane movement between two adjacent glass panes that occurs when the temperature of one pane changes relative to the temperature of the other pane. It may also refer to the relative pane movement that occurs under mechanical influence or other influence (e.g., impact during handling or use).

"Hermetic" refers to a seal that allows helium leakage rates of no more than about $10^{-8}$ to $10^{-9}$ standard cubic centimeters/second ("scc/sec") per foot of seal length.

"Highly-hermetic" refers to a seal that allows helium leakage rates of no more than about $10^{-9}$ scc/sec, and preferably no more than about $10^{-11}$ scc/sec, and most preferably no more than about $10^{-12}$ scc/sec per foot of seal length.

The terms "flexible" and "compliant" refer to a structure having a resilient nature, and the ability to accommodate movement.

The term "non-compliant" refers to a structure having a rigid or brittle nature, in contrast with "flexible" or "compliant".

The term "highly-malleable" refers to an object or material having a yield stress no greater than 10,000 psi (e.g., no greater than 5,500 psi).

The term "cold weld" refers to a weld that is produced by a bonding process (e.g., ultrasonic welding) that does not require the bulk glass temperature or the bulk foil temperature to be substantially above room temperature at the onset of the welding process.

The term "sonotrode" refers to a vibrating tool tip that transmits translational motion to the assembly of substrates to be welded by an ultrasonic welder.

The term "anvil" refers to the surface upon which rests the assembly to be welded by an ultrasonic welder and that resists translational movement of the bottom of the assembly.

The term "inboard," with respect to a weld line location, refers to a location on the side of the weld line that is closest to the centroid of a glass pane being welded.

The phrase "substantially free of step continuities in total thickness," with respect to the flexible seal, refers to limiting total thickness variation to no more than about 0.001 inches.

Figure 1B:
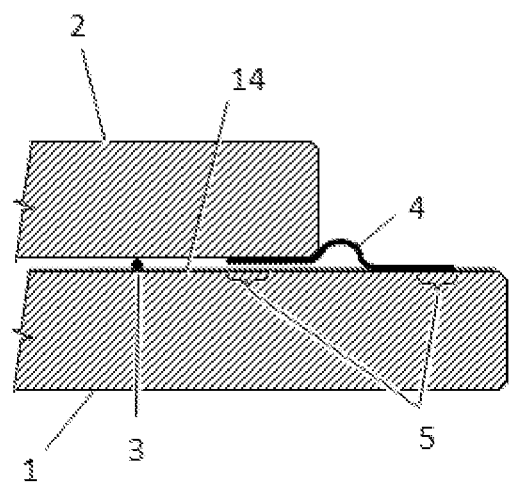
Figure 2A:
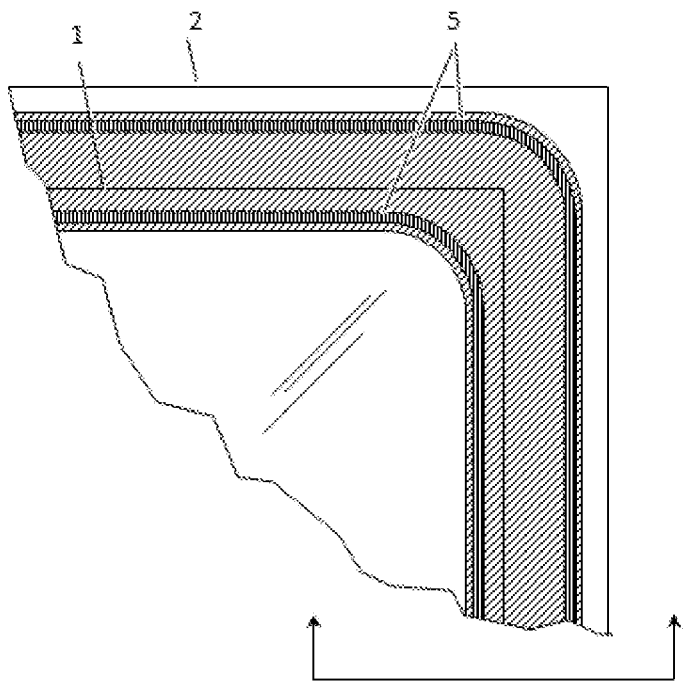
FIG. 2a is an elevation view of a portion of an exemplary enclosure having a joint-less single- or multi-layer foil bridge corner seal.
Figure 2B:
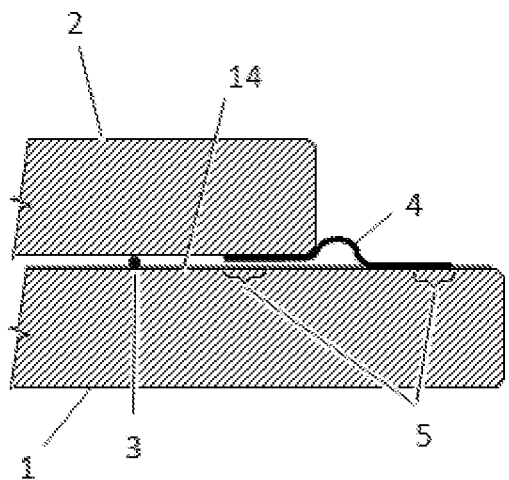
FIG. 2b is partial section view of a portion of the enclosure of FIG. 2a, illustrating a joint-less single- or multi-layer foil bridge corner seal.

FIGS. 1a and 1b show a portion of an exemplary insulated glazing unit including two flat panel elements 1, 2 that are spaced apart by spacers 3 (FIG. 1b) made of an incompressible or substantially incompressible material (e.g., composite, plastic, glass, metal, etc.). Each spacer 3 is relatively small in size (e.g., approximately 100 microns in diameter by 1000 microns long). When the glazing unit is viewed from a distance, the small size of the spacers 3 makes the spacers 3 visually unobtrusive (i.e. substantially invisible under most lighting and background conditions). In some constructions, the spacers 3 can be replaced by a portion of one or both flat panel elements 1, 2. That is, one or both flat panel elements 1, 2 can be formed as a dished The insulated glazing unit also includes an edge seal 4 that is formed by a joint-less single- or multi-layer foil bridge corner seal. As illustrated in FIGS. 1a, 1b, 2a, and 2b, the edge seal 4 can be applied to a glazing unit that has the same-sized first and second flat panel elements 1, 2 (FIGS. 1a and 1b), or that has different-sized first and second flat panel elements 1, 2 (FIGS. 2a, 2b). In both exemplary glazing units, the edge seal 4 includes one or more sheets of foil (e.g., aluminum) that is sized to be approximately as large as the larger glass pane to provide an edge seal 4 that provides a compliant seal without joints. Excess foil, such as that covering the intended viewing area of window glazing units, can be cut away after seal manufacture and recycled. The use of pane-size foil sheets allows for inspection of the assembly (e.g., to check for leaks) during the manufacturing process before the excess foil is cut away and before the foil protruding from the assembly is welded to the second flat panel element 2.

Figure 3A:
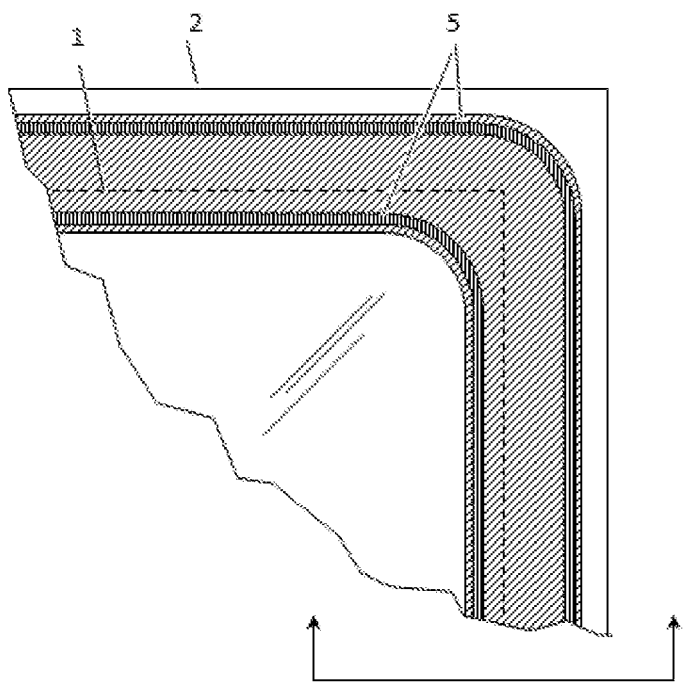
FIG. 3a is an elevation view of a portion of an exemplary enclosure having a joint-less single- or multi-layer foil bridge, dish-drawn seal.
Figure 3B:
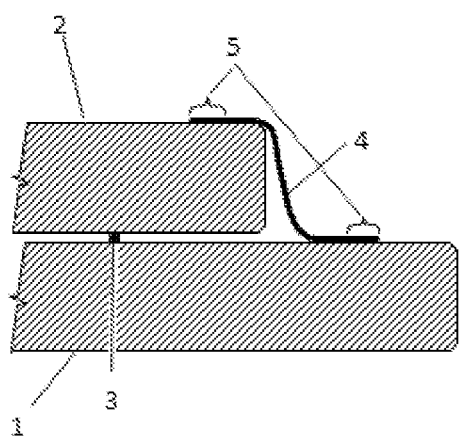
FIG. 3b is a section view of a portion of the exemplary enclosure of FIG. 3a, illustrating a joint-less single- or multi-layer foil bridge, dish-drawn seal.

FIGS. 3a and 3b illustrate a joint-less single- or multi-layer foil bridge corner seal 4 that is formed from dish-drawn foil. In this construction, the foil seal 4 has been drawn into a dished shape with edge flanges offset from each other. The depth of the offset is about the same as the thickness of the second flat panel element 2 to allow a cold weld to be made to the exterior surface of the element 2, which is oriented to face outside the enclosure assembly.

Figure 4:
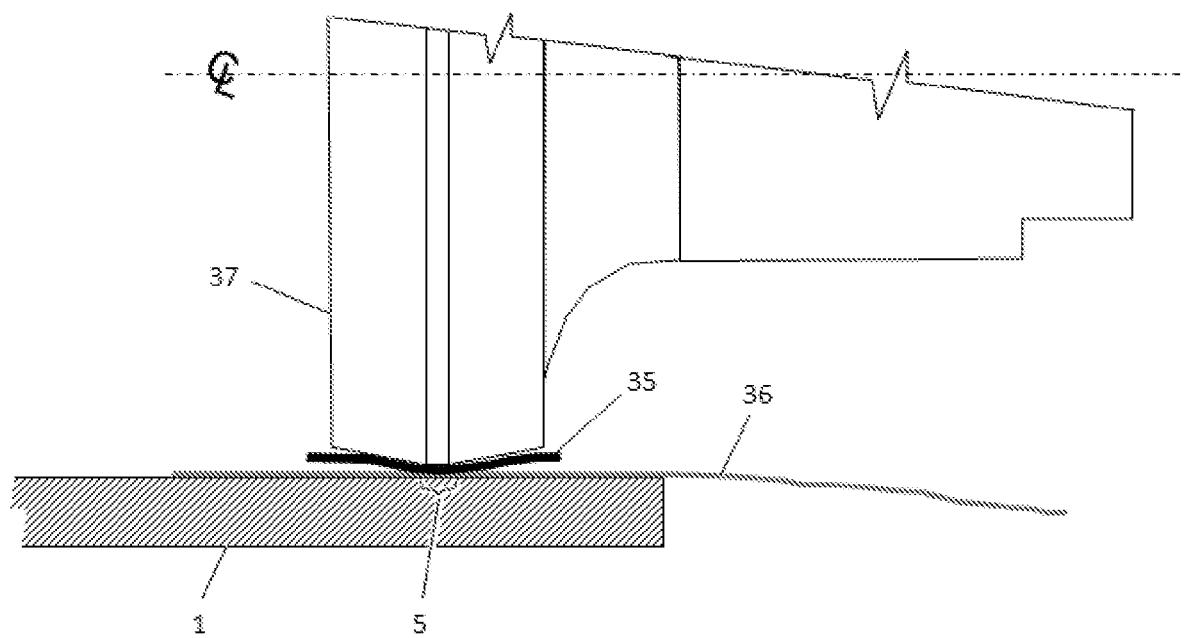
FIG. 4 illustrates an exemplary cold welding process for attaching a multi-layer foil to a wall element.

FIG. 4 illustrates an exemplary cold welding process for welding multi-layer foil 4 to the first flat panel element 1. In this construction, a thin foil 36 is placed in contact with the first flat panel element 1, and a thicker foil 35 is placed in contact with the thin foil 36. A sonotrode 37 of an ultrasonic seam welder (not shown) is used to weld the two foil layers 35, 36 to each other and to the glass surface in a single operation to produce a hermetic seal between two-layer foil 4 and the flat panel element 1.

Figure 5A:
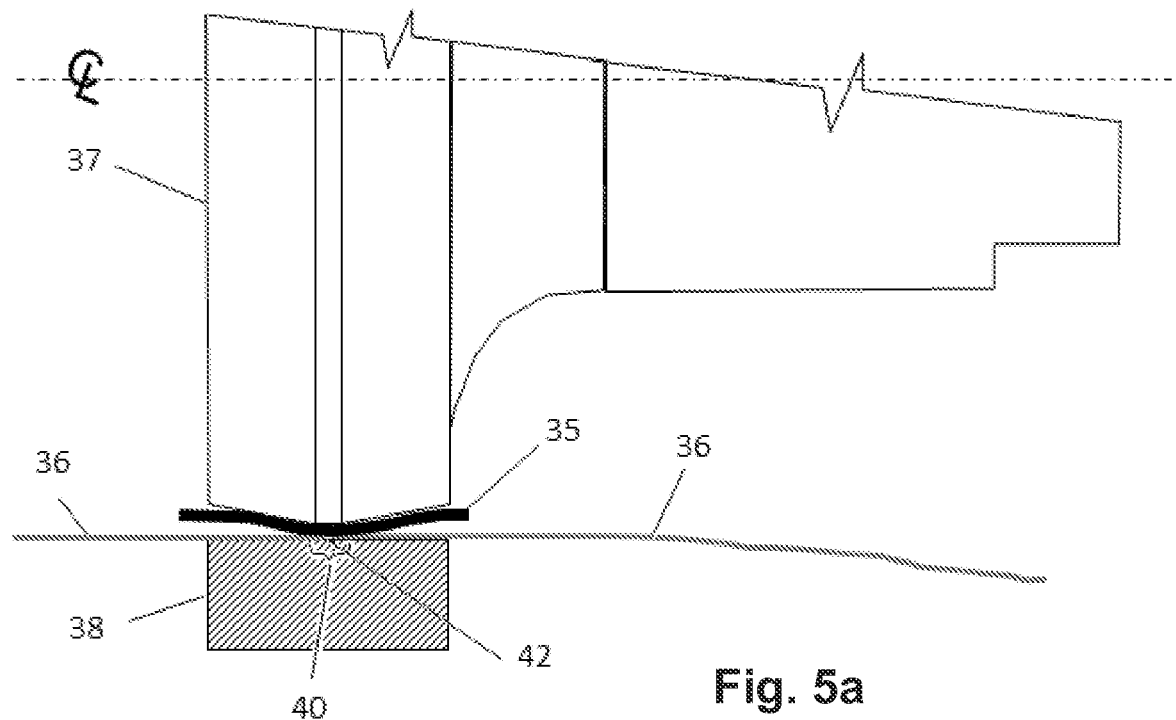
FIG. 5a illustrates an exemplary cold welding process for attaching a two-layer foil splice joint.
Figure 5B:
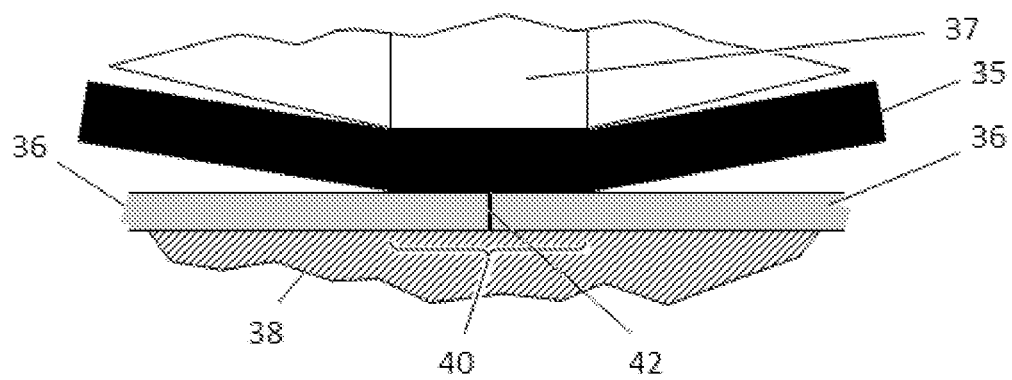
FIG. 5b is an enlarged view of the process of FIG. 5a, illustrating the two layer foil splice joint having a butt joint in one layer.

FIGS. 5a and 5b illustrate an exemplary two-layer foil seal 4 that has a butt weld 40 connecting or joining a butt joint 42 in the foil layer 36. Two pieces of foil 36 ("first foil") are arranged on an anvil 38 to form the butt joint 42, and another piece of foil 35 ("second foil") is arranged over the joint 42 to splice the two pieces of foil 36. The sonotrode 37 can be used to make the spliced butt weld 40.

Figure 6A:
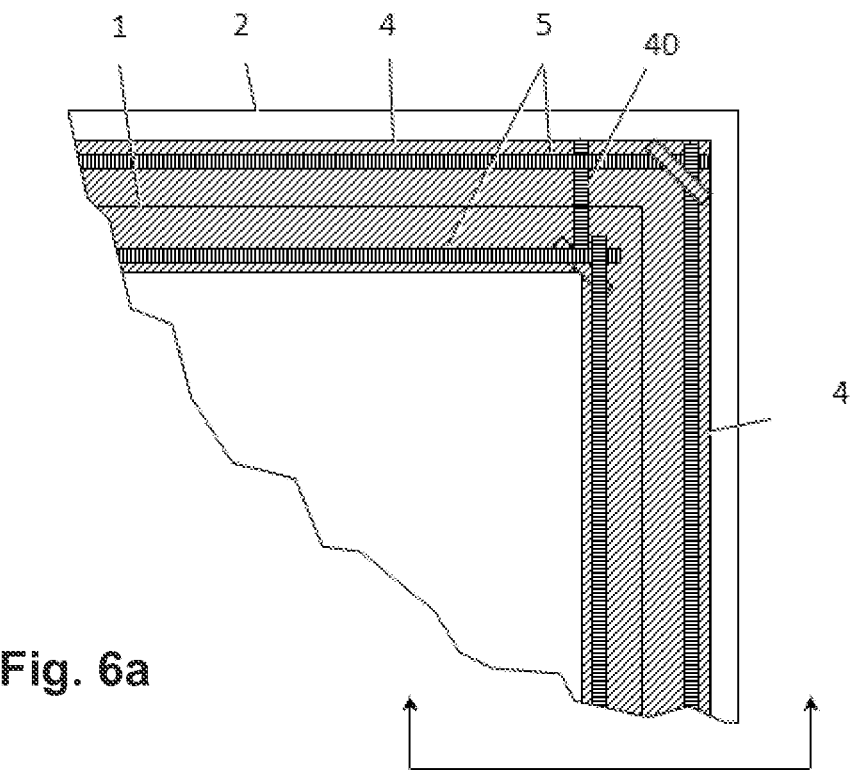
FIG. 6a is an elevation view of a multi-layer foil bridge corner seal using overlapping straight line welds to effect a continuous hermetic seal at the corner.
Figure 6B:
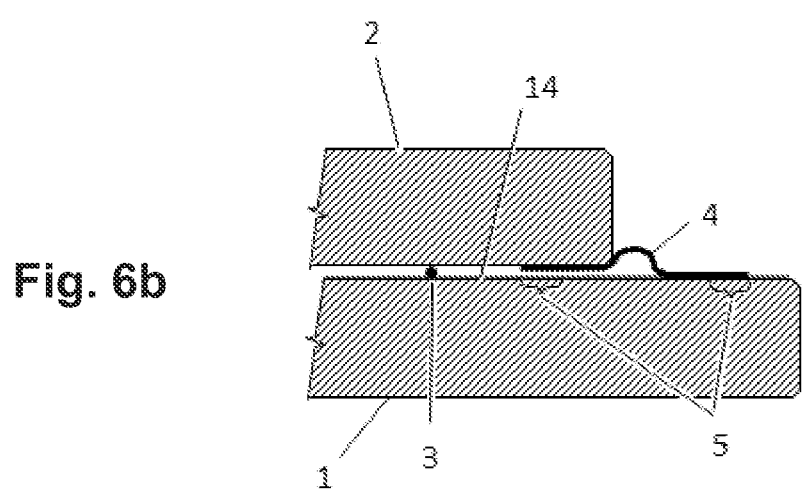
FIG. 6b is a partial section view of the multi-layer foil bridge corner seal of FIG. 6a, illustrating a two-layer splice joint and using overlapping straight line welds to effect the continuous hermetic seal at the corner.

FIGS. 6a and 6b illustrate an exemplary jointed multi-layer foil bridge corner seal 4 including the flexible spliced butt weld 40 illustrated and described with regard to FIGS. 5a and 5b. With reference to FIGS. 6a and 6b, one side of the foil strip 4 is bonded to the gap-side of the first flat panel element 1 (e.g., the gap-side surface can be provided without a coating). The other side of the foil strip 4 is bonded to the second flat panel element 2, which can optionally include a low-emissivity coating 14. As illustrated, overlapping welds 40 are used at the corners to effect a continuous hermetic seal.

Figure 7A:
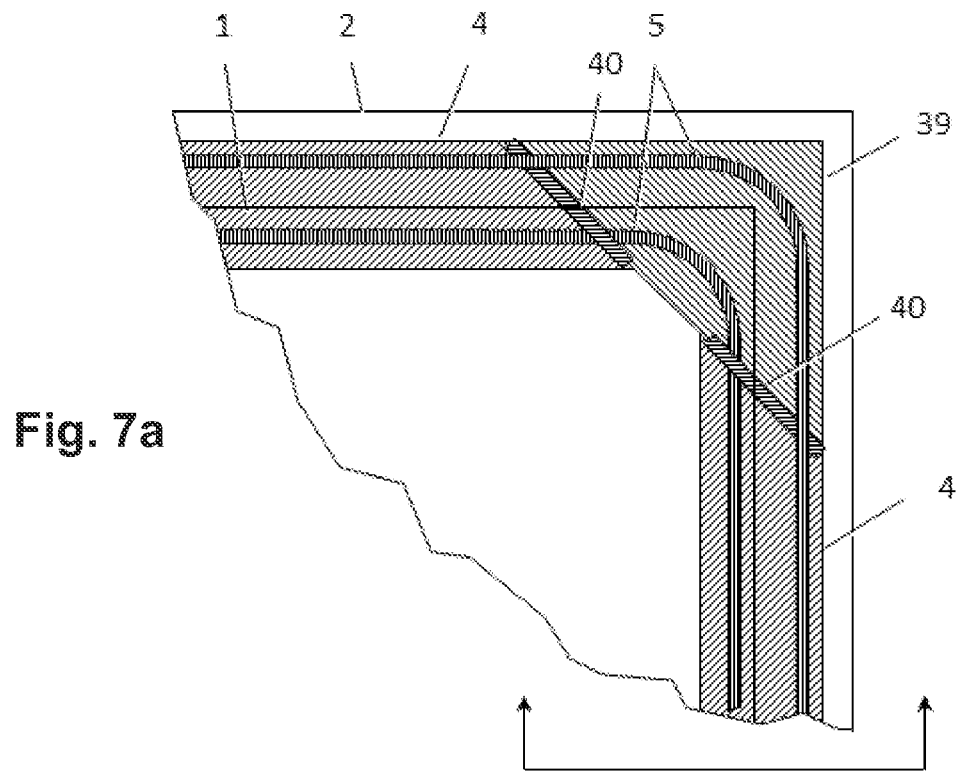
FIG. 7a is an elevation view of a multi-layer foil bridge corner seal having a two-layer splice joint and using a weld following a 90 degree arc to effect a continuous hermetic seal at the corner.
Figure 7B:
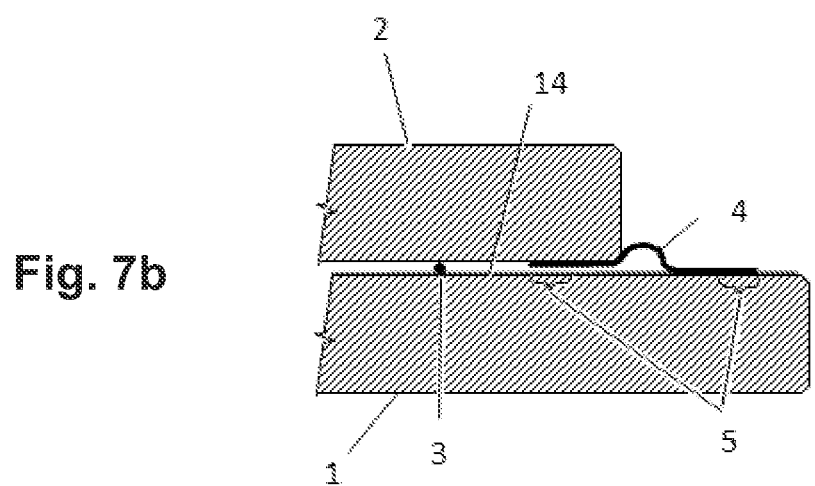
FIG. 7b is a partial section view of the mu multi-layer foil bridge corner seal of FIG. 7a, illustrating a two-layer splice joint and using the weld following a 90 degree arc to effect a continuous hermetic seal at the corner.

FIGS. 7a and 7b illustrate an exemplary foil bridge corner seal or strip 4 that has flexible spliced butt welds 40 that extend between each two-layer foil strip 4 and a two-layer foil triangle 39. The resulting foil strip assembly is bonded by a seam weld 5 to the gap-side of the uncoated flat panel element 1, and by another seam weld 5 to the second flat panel element 2 with the optional low-emissivity coating 14 without removing the coating 14. As illustrated in FIG. 7a, the seam welds 5 follow a circular 90 degree arc at each corner to connect each corresponding pair of straight sections of welds to effect a continuous hermetic seal.

Figure 8A:
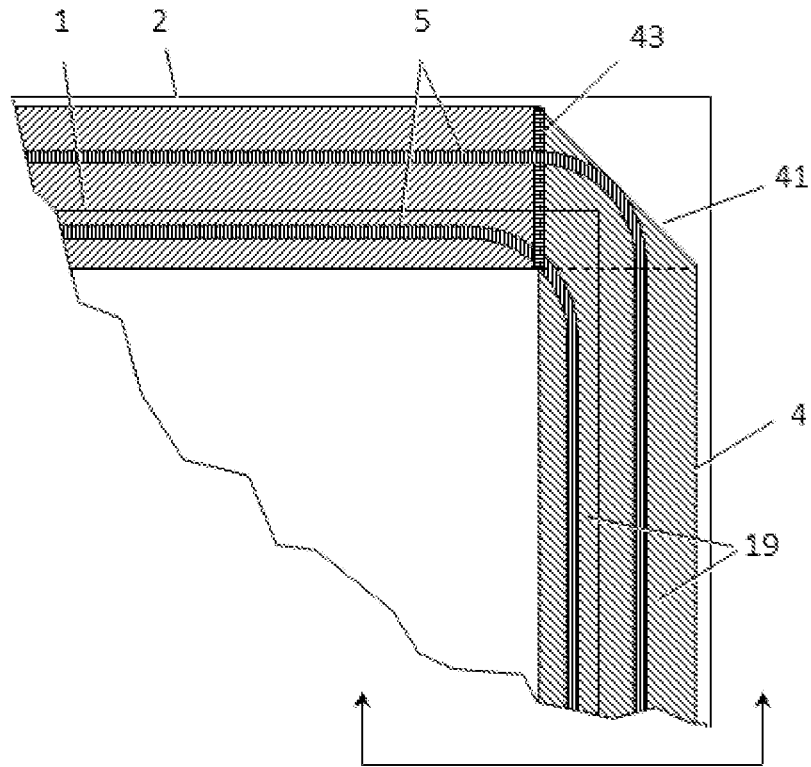
FIG. 8a is an elevation view of a portion of an exemplary enclosure including one aluminum foil layer in a single strip with a right angle fold and a second layer of foil to create welded hermetic seals that cross the paths of subsequent closed-loop welds.
Figure 8B:
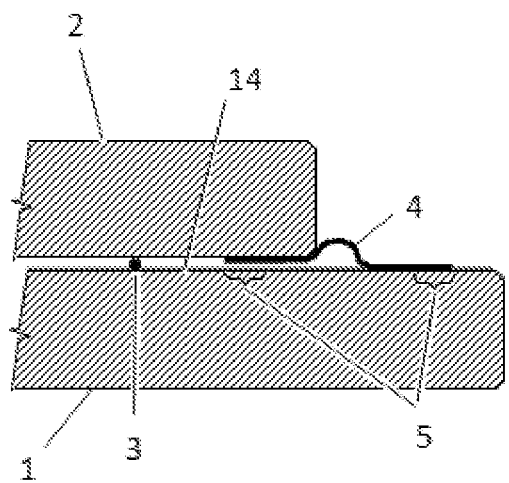
FIG. 8b a partial section view of the enclosure of FIG. 8a, illustrating the aluminum foil layer in a single strip with a right angle fold and a second layer of foil to create welded hermetic seals which cross the paths of subsequent closed-loop welds.

FIGS. 8a and 8b illustrate an exemplary assembly including a right-angle fold in a layer of foil (e.g., foil 36) and an overlaying second, thicker layer of foil (e.g., foil 35). A seam weld 43 is made to hermetically seal across the welds 5 along one or both edges of the folded foil.

Figure 9A:
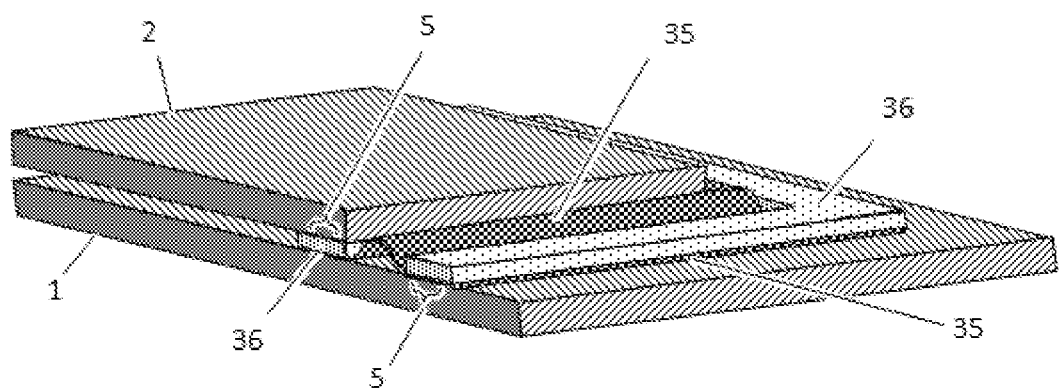
FIG. 9a is a perspective view of a two-layer foil bridge system using only a single thin foil layer as the flexible portion of the edge seal.
Figure 9B:
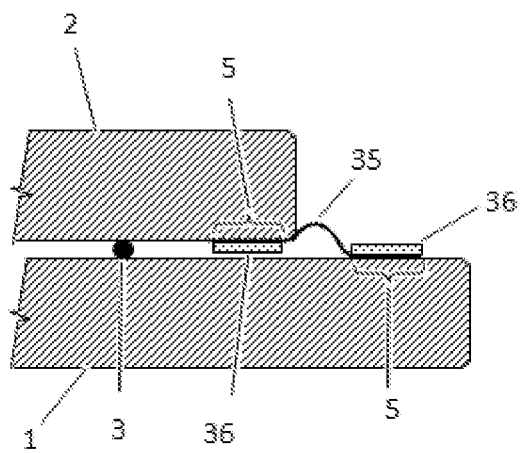

FIGS. 9a and 9b illustrate a two-layer foil bridge system including a single thin foil layer that acts as the flexible portion of the edge seal 4 to reduce heat transfer from the warm pane edge to the cold pane edge (i.e., the foil seal functions as a "warm edge" seal). A foil strip assembly including a wide strip of thin foil 35 serves as the bridge element. Two narrow strips of foil 36 (e.g., thicker than the foil 35) overlay each long edge of the bridge element 35. The two-layer edges are bonded by seam welds 5 to their respective flat panel elements 1, 2. In the corners of panes 1 and 2, a crisscross weld may be used to form a closed loop seal (e.g., see FIGS. 1a, 1b), although a seam weld 5 that follows a circular 90 degree arc at each corner (e.g., see FIGS. 2a, 2b) can connect each corresponding pair of straight sections of welds 5 to effect a continuous closed loop hermetic seal. Substantial contact between foil strip 36 and the flat panel element 1, which could result in additional heat loss, is prevented by using the spacers 3, which maintain a larger gap between the elements 1, 2 than the nominal total thickness of the foil stack or bridge formed by the foils 35, 36.

Figure 10:
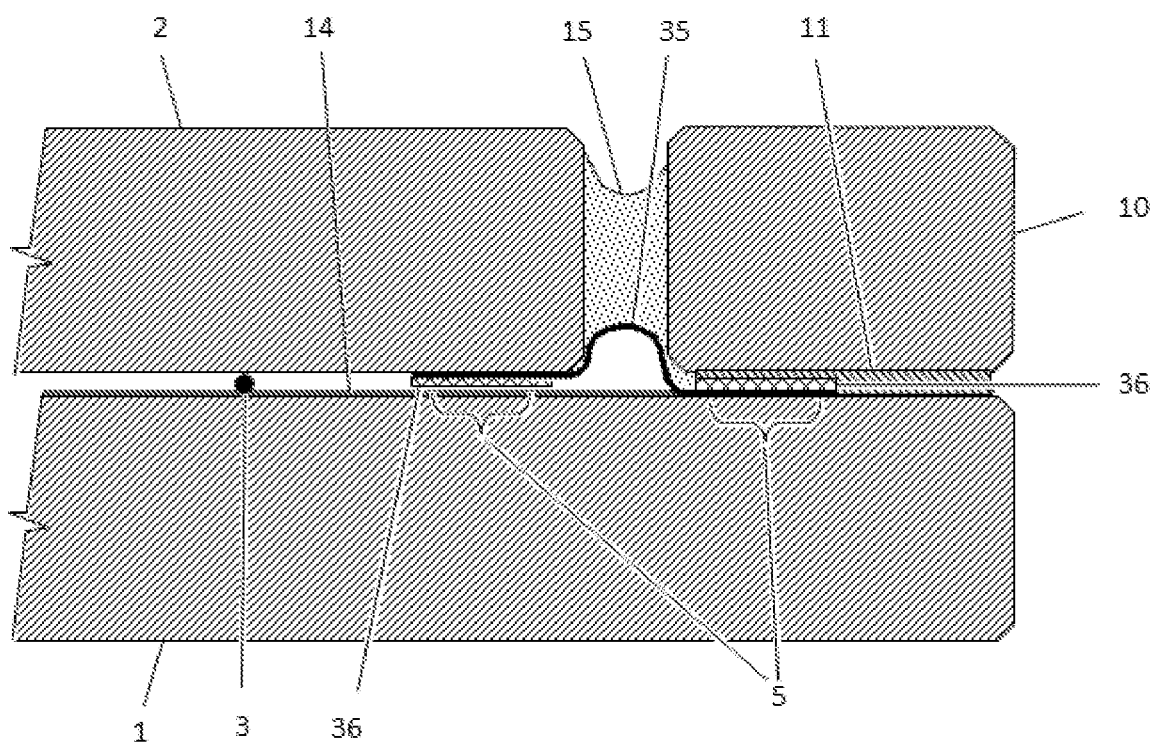
FIG. 10 is a partial section view of an exemplary enclosure including a foil bridge system that has protection for the foil bridge.

FIG. 10 illustrates an exemplary glazing unit with structure that can protect the edge foil bridge from inadvertent damage (e.g., during handling). The exemplary unit includes the foil bridge system described and illustrated with regard to FIGS. 9a and 9b, and a guard strip 10 that is mounted on the exposed portion of the weld 5 using adhesive 11. The guard strip 10 can be continuous at the corners or assembled with joints. The joints and the gap between the guard strip 10 and the edge of the second flat panel element 2 can be filled with a sealant 15.

Figure 11A:
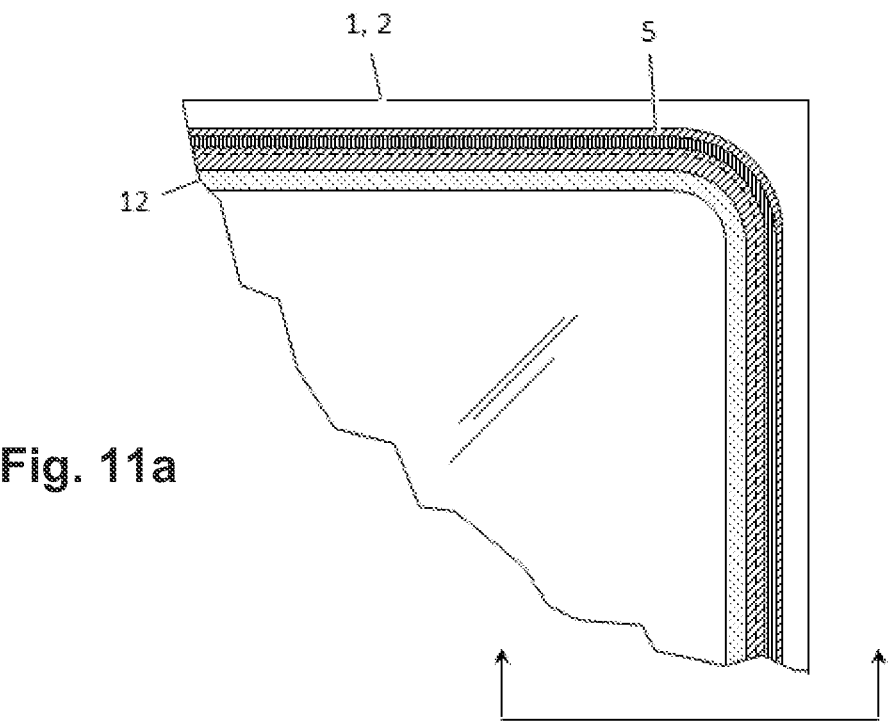
FIG. 11a is an elevation view of an exemplary enclosure including warm-edge, dual-pane insulating glass and the bridge seal according to any of the previous figures.
Figure 11B:
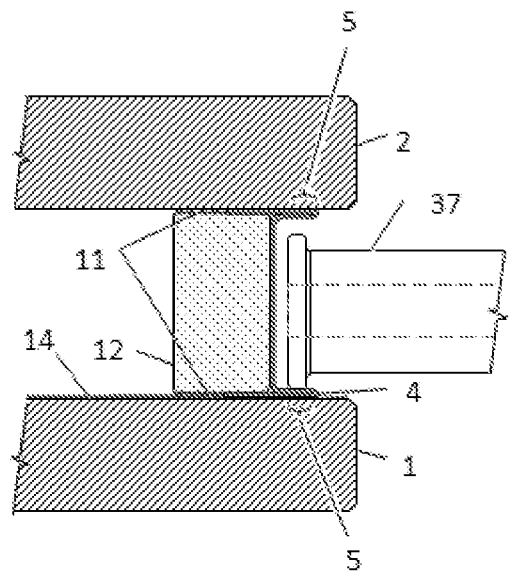
FIG. 11b is a partial section view of one edge of the insulating glass during manufacture of the seal.
Figure 11C:
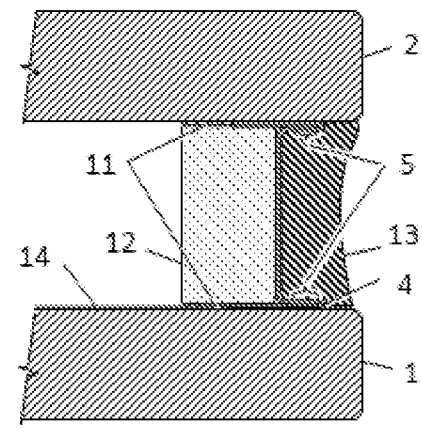
FIG. 11c is a partial section view of one edge of the insulating glass after completion of manufacture of the seal.

FIGS. 11a, 11b, and 11c illustrate a glazing unit including warm-edge dual-pane insulated glass that has been hermetically sealed. FIG. 11b illustrates one edge of the glazing unit during manufacture of the seal 4, whereas FIG. 11c illustrates the edge after completion of manufacture of the seal. The first and second flat panel elements 1, 2 are held parallel and prevented from touching each other by a desiccant-filled insulating spacer 12 that is bonded to each respective flat panel elements 1, 2 by an adhesive strip 11. Hermetic welds 5 of aluminum foil 4 are applied to flat panel elements 1, 2 using the sonotrode 37. A sealant 13 (e.g., having a low permeability to gas) fills the perimeter space between flat panel elements 1, 2.

Figure 12:
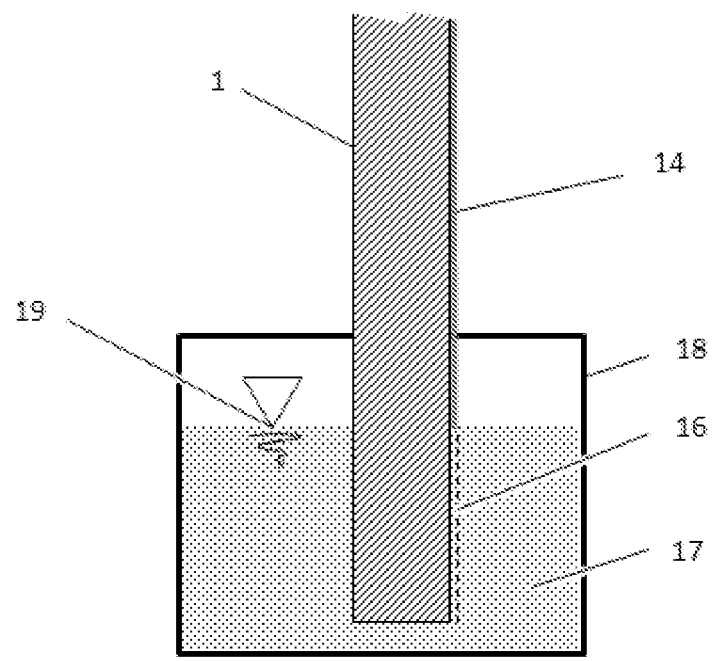
FIG. 12 is a schematic view of a chemical edge deletion process for removing low-emissivity coating from glass.

FIG. 12 illustrates an exemplary chemical edge deletion process for removing the low-emissivity coating 14 from the first flat panel element 1 to leave behind a smooth surface for ultrasonic welding. The process uses a suitable liquid chemical 17 that produces a reaction resulting in a dissolved coating 16 on the portion of the element 1 that is in contact with the chemical 17. The portion of coating that is dissolved can be controlled by the adjusting the level 19 of the liquid chemical 17 in the container 18.

EXAMPLES

Example 1

A square piece of aluminum window screen is cut to 9 inches by 9 inches and mounted with common centers on a clean, untempered 10 inch by 10 inch pane of soda lime glass such that the squares nearly have a common center. Two layers of 1100 series aluminum foil, one 2 mil layer and one 1 mil layer, were placed together such that they could be shear-cut simultaneously to a square shape of 12 inches×12 inches.

This two-layer foil assembly was mounted on top of the window screen, with common center so as to produce an equal amount of foil overhang at each pane edge. An annular region of the glass pane, covered only by foil but not screen, was available for accommodating a weld line. This stacked assembly was mounted onto the table (serving as the anvil) of a 100 watt ultrasonic seam welder of custom design.

A single continuous weld line was made to weld the foil to the lateral glass surface adjacent the edges of the pane, using a straight line weld path except at the corners where the weld path was curved, following a circular 90 degree arc. The end of the weld line overlapped its start to form a closed loop. Inboard of the first closed-loop weld line, a second closed-loop weld line was made, parallel and partially overlapping the first, thereby forming a single weld of greater width than the first.

This assembly was evacuated through an 8 mm diameter hole drilled through the glass pane. The window screen prevented the layered aluminum foil sheet assembly from contacting the glass pane except for the annular area between the edge of the windows screen and the inside edge of the double weld. After holding vacuum overnight, a pressure of less than 1 mTorr was measured by spinning rotor gauge on the pumped connection. No leaks greater that $2E^{-10}$ scc/sec per foot of seal length were found using the helium spray method on a Vacuum Instruments Corporation MS-40 helium leak detector.

Example 2

From the tested assembly produced in Example 1, the foil and window screen was removed from the area inboard of the closed-loop weld, leaving only a continuous, joint-free stripe of two-layer foil welded to the outer edge of the 10 inch square pane. A clean 12 inch by 12 inch soda lime glass pane with sputtered low-emissivity coating on one side was populated on its coated surface with metal spacers about 125 microns thick on a 20 mm×20 mm grid pattern, according to a co-pending patent application. The 10 inch square glass-and-foil assembly was laid atop the spacers of the 12 inch square glass pane, with the foil trapped between the two panes, such that the two glass panes had a common center, and producing an equal amount of foil overhang at each pane edge. An annular region of the larger glass pane was available for accommodating a weld. This stacked assembly was bonded together into an enclosure using the equipment and technique described in Example 1.

A single continuous weld line was made to weld the foil to the lateral glass surface adjacent the edge of the 12 inch square pane, using a straight line weld path except at the corners where the weld path was curved, following a circular 90 degree arc. The end of the weld line overlapped its start to form a closed loop. Inboard of the first closed-loop weld line, a second closed-loop weld line was made, parallel and partially overlapping the first, thereby forming a single weld of greater width than the first.

This two pane assembly was evacuated through an 8 mm diameter hole drilled through the smaller glass pane. The spacers prevented the smaller glass pane from contacting the larger glass pane. A vacuum of less than 1 mTorr was drawn, as measured by spinning rotor gauge on the pumped connection. No leaks greater that $2E^{-10}$ scc/sec per foot of seal length were found using the helium spray method on a Vacuum Instruments Corporation MS-40 helium leak detector.

Example 3

Figure 13:
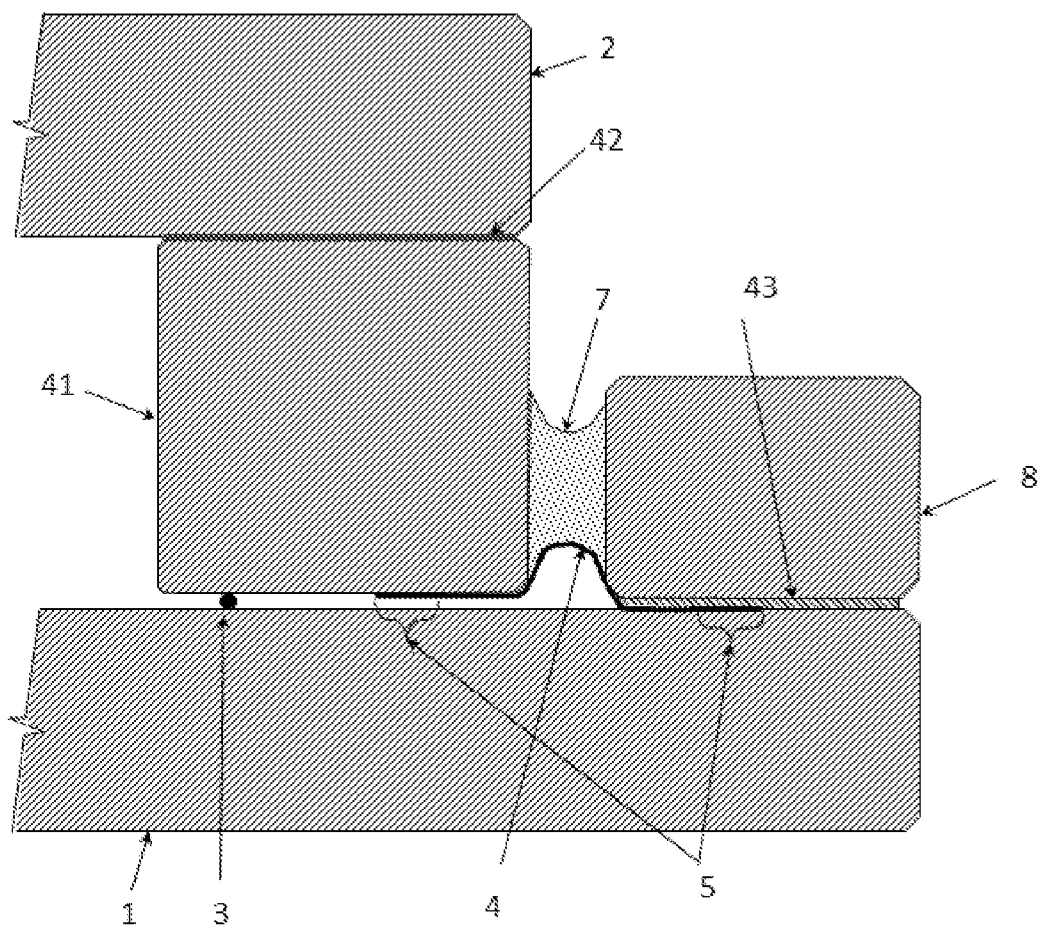
FIG. 13 is a partial section view of an exemplary enclosure including a foil bridge system that has protection for the foil bridge.

With reference to FIG. 13, a highly hermetic seal is formed around a rectangular neutron detector enclosure of 1 meter by 1 meter by 1 centimeter. The enclosure is intended to be filled with argon gas and a sensing apparatus. The enclosure includes two parallel glass panes 1, 2 seal and a glass edge spacer 41. A coating-free clear soda lime glass pane 1 meter×1 meter inch is used for glass pane 1, while a coating-free clear soda lime glass pane 0.975 meters×0.975 meters is used for glass pane 2. Four glass edge spacers 41 (e.g., 0.965 meters long and having a cross-section of 1 cm×1 cm) are rigidly and hermetically bonded to pane 2, each adjacent one edge of pane 2, using solder glass 42. The corner joints between the four glass spacers 42 are likewise filed with solder glass to form highly hermetic seals upon heating to 450° C.

After cooling, excess solder glass at these corner joints, intentionally protruding above the spacer 41 surfaces intended for the weld path, is ground off so the surface of the remaining solder glass 42 is flush with the spacer surface intended for the weld, and is polished to an acceptable finish for ultrasonic welding, that is, a finish comparable to that of the lateral surfaces of the float glass panes 1, 2. Four single-layer aluminum foil strips (e.g., each 13 mm wide and 25 microns thick and 1 meter long) are arranged using accurately-cut butt joints, ultrasonically welded, to form a continuous loop without substantial thickness discontinuities along the surface of glass spacer 41 opposite pane 2 so that only the inner portion of each foil strip is in contact with each corresponding spacer 41 and the outer portion is cantilevered off the outside edge of each spacer 41.

After appropriate fixturing to maintain alignment, a single continuous weld line is made to weld the foil to the lateral glass surface adjacent the edge of glass pane 2, using a straight line weld path except at the corners where the weld path was curved, following a circular 90 degree arc according to the present invention. With continued reference to FIG. 13, the assembled glass pane 2 and the spacer 41 are mounted onto glass pane 1 using a set of rolling rod spacers 3 installed to separate the glass spacer 41 from glass pane 1 to provide a small gap for differential thermal movement of either pane. After appropriate fixturing to maintain alignment, a single continuous weld line is made to weld the foil to the lateral glass surface adjacent the edge of glass pane 1, using a straight line weld path except at the corners where the weld path was curved, following a circular 90 degree arc. The end of the weld line overlaps its start to form a closed loop. Inboard of the first closed-loop weld line, a second closed-loop weld line is made, parallel and partially overlapping the first, thereby forming a single weld of greater width than the first. This two-pane assembly is then placed in a low vacuum chamber and evacuated through an 8 mm diameter hole drilled through the smaller glass pane. The chamber is then backfilled with argon gas.

It is understood that the invention may embody other specific forms, or incorporate combinations of the embodiments described herein, without departing from the spirit or characteristics the invention. While specific embodiments have been illustrated and described, other modifications may be made without significantly departing from the spirit of the invention.

Various features of the invention are set forth in the following claims.

The invention claimed is:

1. A hermetically-sealed enclosure comprising:
   at least two wall elements of substantially congruent shapes;
   a spacer system defining an interior space between the wall elements; and
   a bridge element including one or more flexible metal foil layers extending between adjacent, respective edges of the wall elements to isolate the interior space from a surrounding environment,
   wherein the bridge element is substantially free of step discontinuities in total thickness along the intended weld path, and
   wherein the bridge element is bonded to each of the wall elements via an ultrasonic weld to form a continuous bond line.

2. The enclosure of claim 1, wherein the wall elements include glass.

3. The enclosure of claim 1, wherein the bridge element includes a first foil layer and a second foil layer that is thicker than the first foil layer.

4. The enclosure of claim 3, wherein the first foil layer is defined by two pieces of foil having a butt joint, and wherein the second foil layer overlays the butt joint.

5. The enclosure of claim 1, wherein each foil layer is fabricated from a single sheet of foil.

6. The enclosure of claim 1, wherein at least one foil layer includes separate pieces of foil that are hermetically bonded at a joint between the separate pieces of foil, and wherein the joint crosses the bond line.

7. The enclosure of claim 1, wherein the bridge element is bonded via an ultrasonic weld that forms a plurality of bond lines, and wherein at least part of at least one bond line is defined by a plurality of ultrasonic weld segments overlapping at or near their adjacent ends.

8. The enclosure of claim 1, wherein the bridge element is bonded via an ultrasonic weld that forms a plurality of bond lines, wherein at least part of at least one bond line has first and second ultrasonic weld segments that are adjacent and substantially parallel to each other, and wherein the second ultrasonic weld segment overlaps the first ultrasonic weld segment.

9. The enclosure of claim 1, wherein at least one bond line is made to a coated surface of a wall element without removal of the coating from the bond line region.

10. The enclosure of claim 1, wherein at least one bond line is made to a coated surface of a wall element, and wherein the coating has been removed in the region of the bond line by chemical edge deletion.

11. A method for manufacturing a hermetically-sealed enclosure, the method comprising:
   assembling first and second wall elements of substantially congruent shapes together and separating the two wall elements from each other to form a space;
   extending a bridge element between adjacent, respective edges of the wall elements, the bridge element including one or more layers of flexible metal foil, and the bridge element being substantially free of step discontinuities in total thickness;
   bonding the bridge element to the first wall element by ultrasonic welding to form a continuous bond on the first wall element; and
   bonding the bridge element to the second wall element by ultrasonic welding to form a continuous bond on the second wall element.

12. The method of claim 11, further comprising bonding first and second foil layers to at least one of the first wall element and the second wall element.

13. The method of claim 12, wherein each of the first and second layers is fabricated from a single sheet of foil.

14. The method of claim 12, wherein the first foil layer is defined by two pieces of foil having a butt joint, and wherein the second foil layer overlays the butt joint.

15. The enclosure of claim 11, wherein at least one foil layer includes separate pieces of foil that are hermetically bonded at a joint between the separate pieces of foil, and wherein at least one of the joints crosses the bond line.

16. The method of claim 11, wherein at least one layer of the bridge element includes separate pieces that are hermetically bonded at joints, and wherein at least one of the joints crosses a bond line formed by bonding the bridge element to the first wall element, or a bond line formed by bonding the bridge element to the second wall element.

17. The method of claim 11, further comprising forming a plurality of ultrasonic weld segments that overlap at least one of the bonds at or near their adjacent ends.

18. The method of claim 11, wherein at least one bond formed by the bonding steps is made to a coated surface of a wall element without removal of the coating from the weld path region.

19. The method of claim 11, wherein at least one bond formed by the bonding steps is made to a coated surface of a wall element, and wherein the coating has been removed in the region of the weld path by chemical edge deletion.

20. An insulated glazing unit comprising:
a first flat panel element;
a second flat panel element, the first and second flat panel elements having congruent shapes; and
a plurality of spacers disposed between the first flat panel element and the second flat panel element to space the first flat panel element from the second flat panel element; and
a bridge element including one or more flexible metal foil layers extending between adjacent, respective edges of first and second flat panel elements to isolate the interior space from a surrounding environment,
wherein the bridge element is substantially free of step discontinuities in total thickness along the intended weld path, and
wherein the bridge element is bonded to each of the wall elements via an ultrasonic weld to form a continuous bond line.

* * * * *